(12) United States Patent
Kim et al.

(10) Patent No.: US 8,917,954 B2
(45) Date of Patent: Dec. 23, 2014

(54) METHOD AND APPARATUS FOR CONVERTING 2D VIDEO IMAGE INTO 3D VIDEO IMAGE

(71) Applicant: Electronics and Telecommunications Research Institute, Daejeon (KR)

(72) Inventors: Hye-Sun Kim, Daejeon (KR); Yun Ji Ban, Daejeon (KR); Kyung Ho Jang, Daegu (KR); Jung Jae Yu, Seongnam (KR); Myung Ha Kim, Daejeon (KR); Ho Wook Jang, Daejeon (KR); Seung Woo Nam, Daejeon (KR); Hae Dong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 108 days.

(21) Appl. No.: 13/859,634

(22) Filed: Apr. 9, 2013

(65) Prior Publication Data

US 2013/0266212 A1    Oct. 10, 2013

(30) Foreign Application Priority Data

Apr. 9, 2012   (KR) .................. 10-2012-0036762

(51) Int. Cl.
*G06K 9/00* (2006.01)
*H04N 13/00* (2006.01)
*H04N 13/02* (2006.01)

(52) U.S. Cl.
CPC ......... *H04N 13/0022* (2013.01); *H04N 13/026* (2013.01); *H04N 13/0271* (2013.01)
USPC .......................................... 382/285; 382/154

(58) Field of Classification Search
CPC .......... H04N 13/0022; H04N 13/0271; H04N 13/026; G06T 7/0075

USPC .................. 382/154, 285; 715/757, 852; 345/FOR. 209
See application file for complete search history.

(56) References Cited

U.S. PATENT DOCUMENTS 6,496,598 B1   12/2002   Harman
8,718,356 B2 *  5/2014   Appia et al. ................. 382/154
(Continued)

FOREIGN PATENT DOCUMENTS

KR    10-2009-0008808 A    1/2009
KR    10-2010-0064196 A    6/2010
KR    10-2011-0068870 A    6/2011

OTHER PUBLICATIONS

Yong Ju Jung et al., "A novel 2D-to-3D conversion technique based on relative height depth cue", Stereoscopic Displays and Applications XX, Proceedings of SPIE-IS&T Electronic Imaging, 2009, pp. 72371U-72371U-8, vol. 7237, SPIE.

Chao-Chung Cheng et al., "Hybrid Depth Cueing for 2D-to-3D Conversion System", Stereoscopic Displays and Applications XX, Proceedings of SPIE-IS&T Electronic Imaging, 2009, pp. 723721-723721-8, vol. 7237, SPIE.

(Continued)

*Primary Examiner* — Brian Le

(57) ABSTRACT

A method of converting a two-dimensional video to a three-dimensional video, the method comprising: comparing an image of an $n^{th}$ frame with an accumulated image until an $n-1^{th}$ frame in the two-dimensional video to calculate a difference in a color value for each pixel; generating a difference image including information on a change in a color value for each pixel of the $n^{th}$ frame; storing an accumulated image until the $n^{th}$ frame by accumulating the information on the change in the color value for each pixel until the $n^{th}$ frame; performing an operation for a pixel in which a change in a color value is equal to or larger than a predetermined level by using the difference image to generate a division image and a depth map image; and converting the image of the $n^{th}$ frame to a three-dimensional image by using the depth map image.

6 Claims, 9 Drawing Sheets
(3 of 9 Drawing Sheet(s) Filed in Color)

(56) References Cited

U.S. PATENT DOCUMENTS

2010/0080448 A1* 4/2010 Tam et al. ............... 382/154
2011/0134109 A1  6/2011 Izumi
2013/0156294 A1* 6/2013 Wei ........................ 382/154

OTHER PUBLICATIONS

Chao-Chung Cheng et al., "A 2D-to-3D Conversion System Using Edge Information", 2010, IEEE.

* cited by examiner

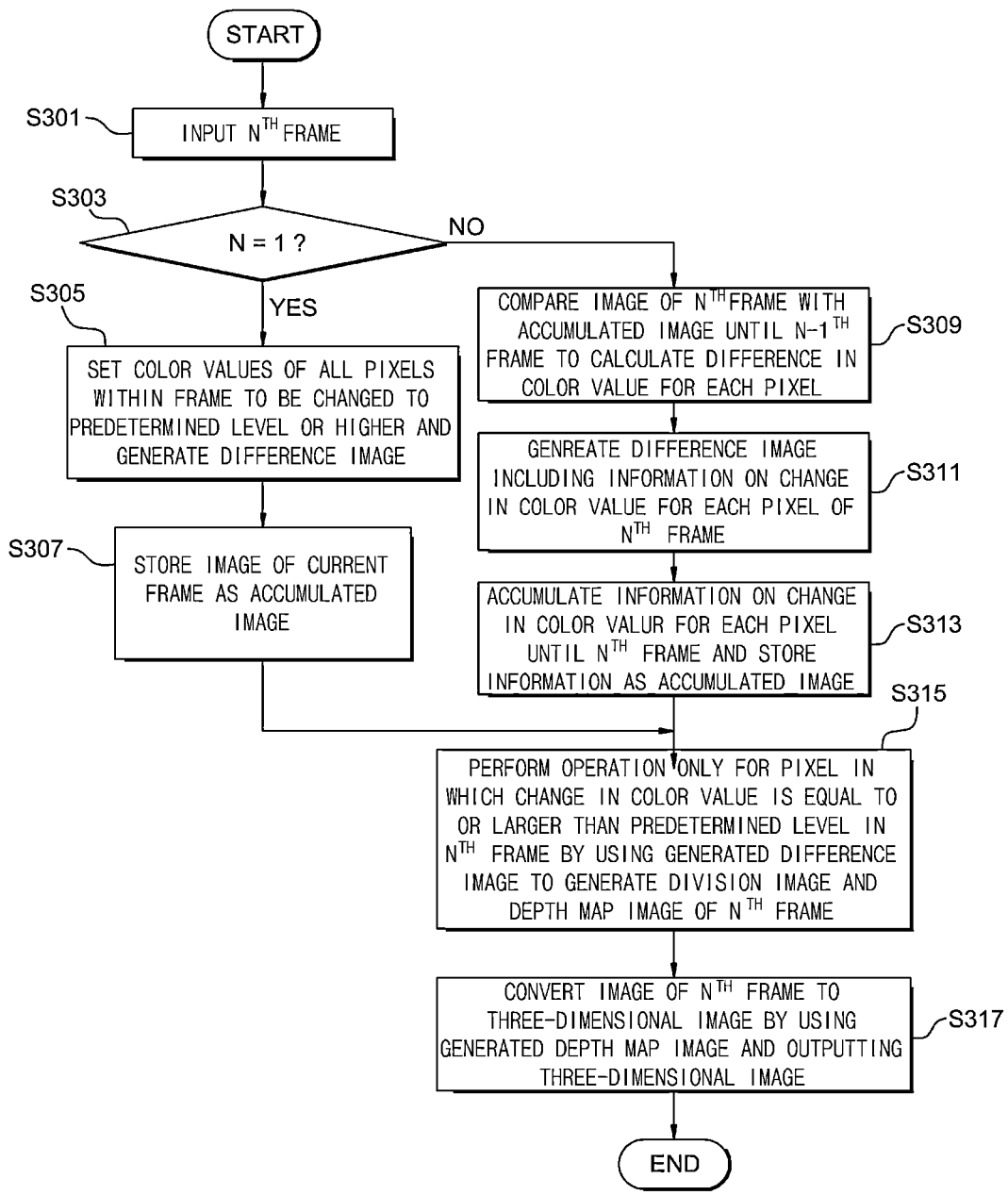

METHOD AND APPARATUS FOR CONVERTING 2D VIDEO IMAGE INTO 3D VIDEO IMAGE

CROSS-REFERENCE TO RELATED APPLICATIONS

This application is based on and claims priority from Korean Patent Application No. 10-2012-0036762, filed on Apr. 9, 2012, with the Korean Intellectual Property Office, the disclosure of which is incorporated herein in its entirety by reference.

TECHNICAL FIELD

The present disclosure relates to a method and an apparatus for automatically converting consecutive two-dimensional video inputs to a three-dimensional video.

BACKGROUND

A person recognizes a depth when watching an object because left and right eyes transfer different images to a brain from different positions. A person's brain recognizes a depth of the object due to a phase difference between the two images input through the left and right eyes.

Accordingly, when a stereoscopic image is generated, a pair of images including a left image and a right image needs to be always generated. When a stereoscopic image is generated by a camera, photographing should be performed using two cameras including left and right cameras at the same time. When a video photographed by one camera is converted to a stereoscopic video, two images including left and right images should be provided through one source video. Although both of the methods can make high quality contents, they require a lot of time and efforts.

Recently, a system capable of automatically converting a two-dimensional video to a three-dimensional stereoscopic video without manually corrected by a person has been researched and developed. An image processing algorithm of an automatic stereoscopic video conversion system is divided into various techniques.

First, there is a method using motion parallax. In a sequential frame structure of the video, when a motion in a horizontal direction exists, there is an available method using a current frame and a frame after a proper horizontal motion is detected as left and right images, respectively, as a representative example. This method is commercialized as an internal function of a 3D TV since the method achieves a simple logic and real-time performance.

Second, a method having the same basic idea of using motion information on the video but generating left and right images after recognizing an amount of motion as depth information and generating a depth map or a method of assigning a three-dimensional effect by forwardly disposing a depth value of a foreground after dividing the image into the foreground and a background according to motion information is also actively researched.

However, the methods using the motion information can be used only for making a simple three-dimensional effect, but not in a case when the three-dimensional effect of the video has a slight motion and there is a limitation in making an accurate stereoscopic image due to discontinuity between the motion information and the three-dimensional effect. Since a video having no motion information should newly generate the motion information, a lot of processing time for converting the video to a stereoscopic image is required.

Third, there is a method of generating the three-dimensional effect by using color information without the motion information. The method divides the image into several segmentation areas by using a color value of the image, and then assigns the three-dimensional effect in the unit of segmentations according to a predetermined depth value assignment rule. In general, the assignment of the depth value uses a method of allocating a forward depth value to a bottom area of the image and allocating a backward depth value to a top area of the image. There is also a method of extracting and using only an edge component by using the color information for a real-time processing.

FIGS. 1A to 1D are diagrams illustrating a method of generating a stereoscopic image using color information in the related art.

When pixels having similar color values are grouped into the same area according to color information in an input image as shown in FIG. 1A, the input image is displayed as several division areas as shown in FIG. 1B. Subsequently, when a depth value is backwardly disposed in the unit of division areas from a bottom side to a top side of the image according to a general depth value assignment rule, a depth map as shown in FIG. 1C is generated. FIG. 1D shows a stereoscopic image having left and right parallax generated by shifting an original image according to a depth value of the generated depth map.

In a case of a single image instead of a video, the stereoscopic image can be generated only through the processing procedures such as FIGS. 1A to 1D. However, in a video including consecutive frames, there is no predetermined connectivity between two consecutive frames only with the above procedures, and thus each frame obtains a different division result and, particularly, a depth value is frequently changed without continuity in the depth map sensitive to a position of the division area, so that a flickering phenomenon by which the video is disconnected and a screen is flickering is generated.

Recently, although new technologies for compensating for mutual disadvantages by simultaneously using the motion information and the color information of the two-dimensional video are researched, there are disadvantages in that a processing time is greatly increased while handling further various information.

SUMMARY

The present disclosure has been made in an effort to provide a method and an apparatus capable of automatically converting a two-dimensional video to a three-dimensional video by using color information without a flickering phenomenon.

The present disclosure also has been made in an effort to provide a method and an apparatus for converting a two-dimensional video to a three-dimensional video capable of guaranteeing real-time performance of a conversion through a simple image dividing method using the color information.

An exemplary embodiment of the present disclosure provides a method of converting a two-dimensional video to a three-dimensional video, the method including: comparing an image of an $n^{th}$ frame with an accumulated image until an $n-1^{th}$ frame in the two-dimensional video to calculate a difference in a color value for each pixel; generating a difference image including information on a change in a color value for each pixel of the $n^{th}$ frame by using the difference in the color value; storing an accumulated image until the $n^{th}$ frame by accumulating the information on the change in the color value for each pixel until the $n^{th}$ frame; performing an operation only for a pixel in which a change in a color value is equal to or larger than a predetermined level in the $n^{th}$ frame by using the difference image to generate a division image and a depth map image of the $n^{th}$ frame; and converting the image of the $n^{th}$ frame to a three-dimensional image by using the depth map image.

The generating of the difference image may include generating an image by classifying a pixel in which the difference in the color value between the image of the $n^{th}$ frame and the accumulated image until the $n-1^{th}$ frame is equal to or larger than a predetermined value into a first area and a pixel in which the difference in the color value is smaller than the predetermined value into a second area, respectively.

The storing of the accumulated image may include allocating a color value of the image of the $n^{th}$ frame to a pixel included in the first area of the difference image in the $n^{th}$ frame and allocating a color value of the accumulated image until the $n-1^{th}$ frame to a pixel included in the second area.

The generating of the division image may include dividing the image of the $n^{th}$ frame into two or more division areas according to a color value for each pixel, wherein a division area is newly determined only for a pixel included in the first area of the difference image and a division area of the $n-1^{th}$ frame is equally applied to a pixel included in the second area.

The generating of the depth map image may include backwardly allocating a depth value in a unit of division areas from a bottom side to a top side of the division image of the $n^{th}$ frame according to a predetermined depth value assignment rule.

The converting to the three-dimensional image may include shifting the image of the $n^{th}$ frame according to the depth value of the depth map image to horizontally generate left and right parallax.

Another exemplary embodiment of the present disclosure provides an apparatus for converting a two-dimensional video to a three-dimensional video, the apparatus including: a color value calculator configured to compare an image of an $n^{th}$ frame with an accumulated image until an $n-1^{th}$ frame in the two-dimensional video to calculate a difference in a color value for each pixel; a difference image generator configured to generate a difference image including information on a change in a color value for each pixel of the $n^{th}$ frame by using the difference in the color value; an accumulated image storage unit configured to store the accumulated image created by accumulating the information on the change in the color value for each pixel until the $n^{th}$ frame; a division/depth map image generator configured to perform an operation only for a pixel in which a change in a color value is equal to or larger than a predetermined level in the $n^{th}$ frame by using the difference image to generate a division image and a depth map image of the $n^{th}$ frame; and a three-dimensional image output unit configured to convert the image of the $n^{th}$ frame to a three-dimensional image by using the depth map image and outputting the three-dimensional image.

According to the exemplary embodiments of the present disclosure, it is possible to automatically convert a two-dimensional video to a three-dimensional video without a flickering phenomenon while maintaining continuity between frames by using a difference image and an accumulated image of a video frame.

It is also possible to reduce complexity of an operation and significantly improve a processing rate by newly performing the operation restrictively only for an area in which a motion equal to or larger than a predetermined level is detected by using the difference image in a processing procedure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is flowchart illustrating a method of converting a two-dimensional video to a three-dimensional video according to an exemplary embodiment of the present disclosure.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

A main object of the present disclosure is to prevent a flickering phenomenon and generate a smooth stereoscopic video when a two-dimensional video is automatically converted to a three-dimensional video. To this end, the present disclosure has a main technical feature that uses a difference image and an accumulated image of consecutive input frames to guarantee connectivity between two consecutive frames while using color information on the video. The difference image refers to an image in which an image of a current frame ($n^{th}$ frame) and an image of a previous frame ($n-1^{th}$ frame) are compared for each pixel and information on a change in a color value is recorded, and is generated using an absolute value of a value created by subtracting a color value of the image of the previous frame from a color value of the image of the current frame for each pixel. The accumulated image refers to an image in which a color value is updated for only a part in which the color value is changed to have a value equal to or larger than a predetermined level for each pixel in the current frame and information on the change is accumulated and stored, and is used for generating the difference image.

Figure 1A:
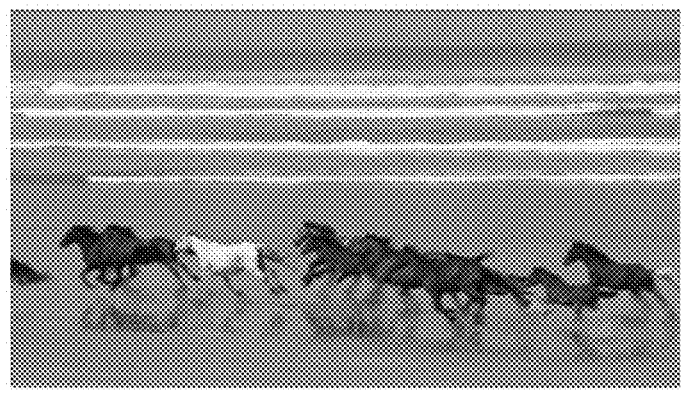
FIGS. 1A to 1D are diagrams illustrating a method of generating a stereoscopic image using color information in the related art.
Figure 1B:
Figure 1C:
Figure 1D:
Figure 2A:
FIGS. 2A to 2C are diagrams illustrating an example of generating a difference image according to the present disclosure.
Figure 2B:
Figure 2C:
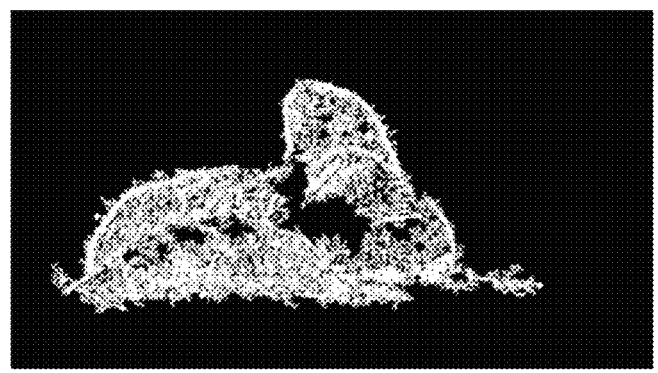

FIGS. 2A to 2C are diagrams for describing an example of generating the difference image according to the present disclosure.

FIGS. 2A and 2B illustrate images of two consecutive frames included in the video. That is, FIG. 2A is an image of an n−1$^{th}$ frame and FIG. 2B is an image of an n$^{th}$ frame.

FIG. 2C is a difference image of the n$^{th}$ frame, and corresponds to an image in which an area of the difference image is binarized into two parts (0: black area/1: white area) to be suitable for a structure of a system to which the present disclosure is applied. It can be identified that an area in which a motion is detected and a color value is changed to a predetermined level or higher for each pixel in the image of the n$^{th}$ frame is expressed as the white area, and an area in which a motion is slight and a color value is not changed to the predetermined level or higher is expressed as the black area.

Meanwhile, when the difference image is generated, a difference in the color value smaller than a predetermined value is ignored to remove noise unique to the video. However, when the video is gradually changed due to the difference in the color value smaller than the predetermined value over several frames, it is not possible to continuously detect the difference, so that the present disclosure uses the accumulated image in which the information on the change in the color value for each pixel is accumulated and stored to compensate for the problem in which the difference cannot be detected. That is, a pixel recognized as the noise since there is no change in the color value or the change in the color value is slight in the n$^{th}$ frame, directly stores the color value of the n−1$^{th}$ frame in the accumulated image, and uses the stored accumulated image in generating a difference image in the future. Accordingly, in a case of pixels which are gradually and finely changed over several frames, a changed part may not be reflected due to being recognized as the noise in a first difference image. However, when a change equal to or larger than a predetermined value is generated as the difference is continuously accumulated, a changed color value is finally reflected to the difference image.

FIG. 3 is a flowchart illustrating a method of converting a two-dimensional video to a three-dimensional video according to an exemplary embodiment of the present disclosure. More specifically, FIG. 3 illustrates a method of converting each frame image to a three-dimensional image and outputting the converted three-dimensional image when sequential frames of a two-dimensional video are input.

Referring to FIG. 3, a difference image is first generated by setting color values of all pixels within a first frame (n=1) of sequentially input frames of the video to be changed to a predetermined level or higher in step S305, and an image of a current frame is stored as an accumulated image in step S307.

From a second frame (n≥2), the image of the input n$^{th}$ frame and the accumulated image until n−1$^{th}$ frame are compared and a difference in the color value for each pixel is calculated in step S309, a difference image including information on the change in the color value for each pixel of the n$^{th}$ frame is generated according to a result of the calculation in step S311, and the information on the change in the color value for each pixel until the n$^{th}$ frame is accumulated and stored as the accumulated image in step S313.

Specifically, the difference image of the n$^{th}$ frame is generated such that a pixel in which a difference in the color value for each pixel between the image of the n$^{th}$ frame and the accumulated image until the n−1$^{th}$ frame is equal to or larger than a predetermined value and a pixel in which a difference in the color value is smaller than the predetermined value are divided into a first area and a second area. Here, the first area corresponds to a white area of FIG. 2C and the second area corresponds to a black area of FIG. 2C.

In the accumulated image of the n$^{th}$ frame, the color value of the image of the current (n$^{th}$) frame is stored for the pixel included in the first area of the difference image, and the color value of the accumulated image until the previous (n−1$^{th}$) frame is stored for the pixel included in the second area of the difference image.

As described above, it is possible to obtain the difference image to detect even a gradual change of the image by using the difference image and the accumulated image together, and such a difference image is reflected to a subsequent process of generating a division image and a depth map image, and thus plays a very important role in maintaining continuity of the three-dimensional image.

The following <code 1> implements the method of generating the difference image and the accumulated image through a general programming language. In the <code 1>, n denotes a frame number, frame n(x, y) denotes an image of an n$^{th}$ frame, Diff$_n$(x, y) denotes a difference image of the n$^{th}$ frame, acc_frame$_n$(x, y) denotes an accumulated image until the n$^{th}$ frame, (x, y) denotes a pixel with the frame, and a denotes a reference parameter (predetermined value) reflecting a difference in a color value to the difference image.

<Code 1>

```
if (n == 1) {
    Diff_n(x, y) = 1;
    acc_frame_n(x, y) = frame_n(x, y);
}
else {
    if (frame_n(x, y) − acc_frame_{n−1}(x, y) < a){
        Diff_n(x, y) = 0;
    }
    else {
        Diff_n(x, y) = 1;
        acc_frame_n(x, y) = frame_n(x, y);
    }
}
```

Subsequently, a division image and a depth map image of the n$^{th}$ frame are generated by newly performing an operation for only a pixel in which a change in the color value is equal to or larger than a predetermined level in the n$^{th}$ frame by using the generated difference image in step S315.

That is, in order to generate the division image of the n$^{th}$ frame, a division area is newly determined only for a pixel included in the first area of the difference image in the division image of the n−1$^{th}$ frame corresponding to a previous processing result and a division area of the n−1$^{th}$ frame is equally applied for a pixel included in the second area, instead of processing the entire frame again. Similarly, when the depth map image is generated, only pixels in the first area recognized as having a motion are modified to have new depth values in the difference image of the n$^{th}$ frame and pixels in the second area are maintained to have depth values of the previous frame.

Subsequently, the image of the n$^{th}$ frame is converted to a 3D image and the converted 3D image is output by using the generated depth map image in step S317. At this time, the three-dimensional image may be implemented by horizontally generating left and right parallax by shifting the image of the n$^{th}$ frame according to a depth value of the generated depth map image.

Figure 4A:
FIGS. 4A to 4D are diagrams illustrating images generated by applying a converting method according to the present disclosure.
Figure 4B:
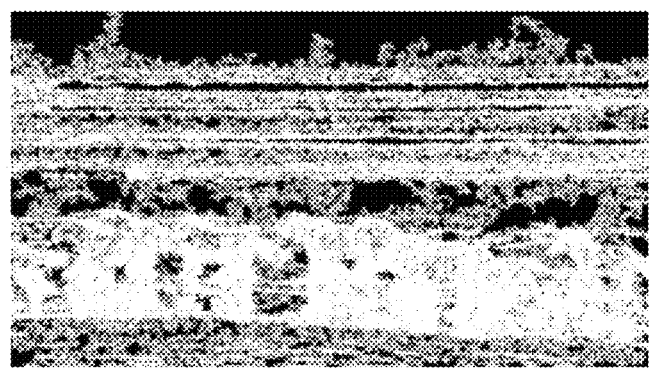
Figure 4C:
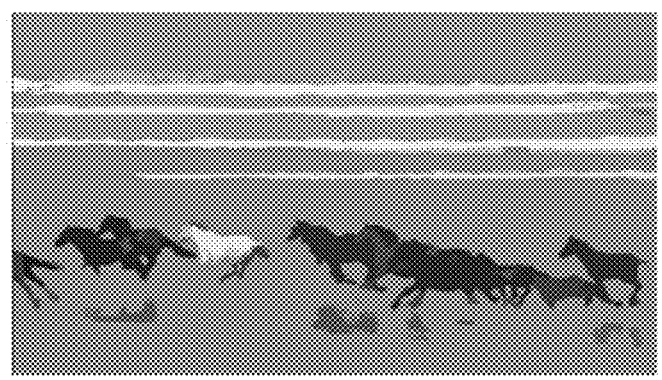
Figure 4D:
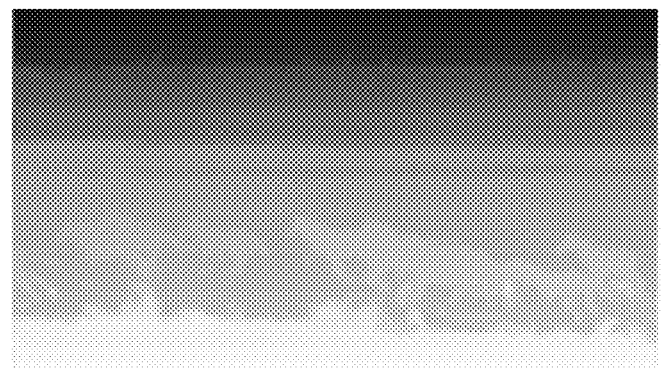

FIGS. 4A to 4D are diagrams illustrating images generated by applying a converting method according to the present disclosure. When FIG. 4A is the input image of the n$^{th}$ frame, FIG. 4B shows a difference image of the corresponding frame, FIG. 4C shows a division image reflecting the difference image, and FIG. 4D shows a depth map image reflecting the difference image.

Figure 5A:
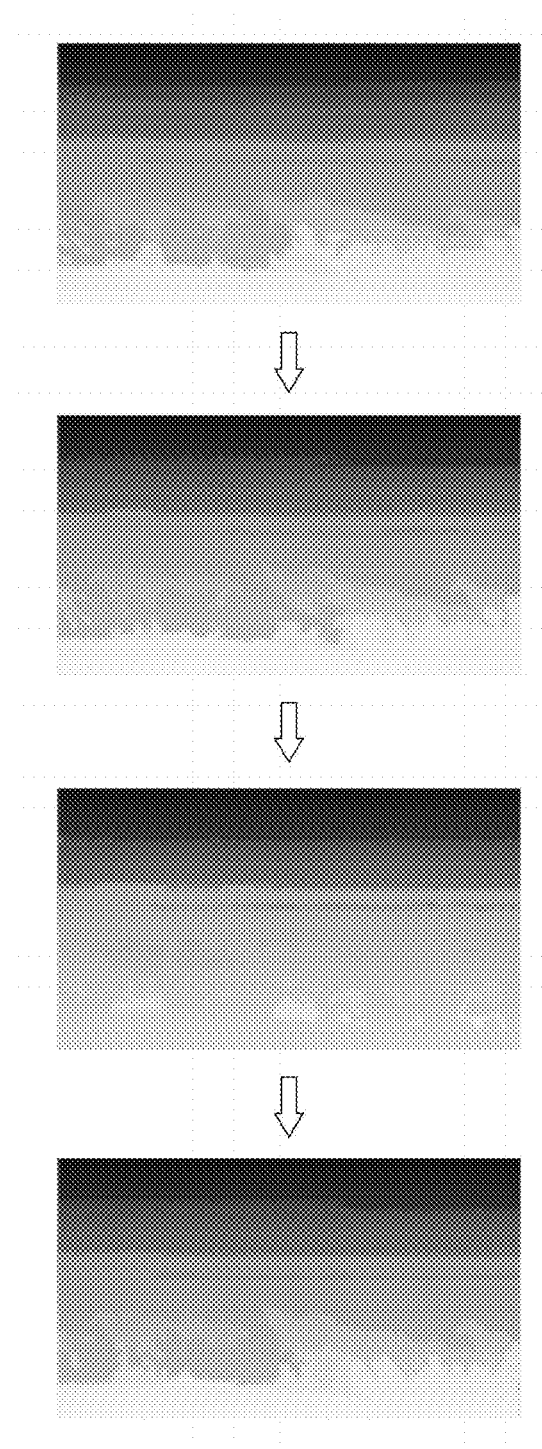
FIGS. 5A and 5B are diagrams comparatively illustrating depth map images generated by applying a three-dimensional converting method in the related art and a three-dimensional converting method according to the present disclosure to consecutive identical frames, respectively.
Figure 5B:
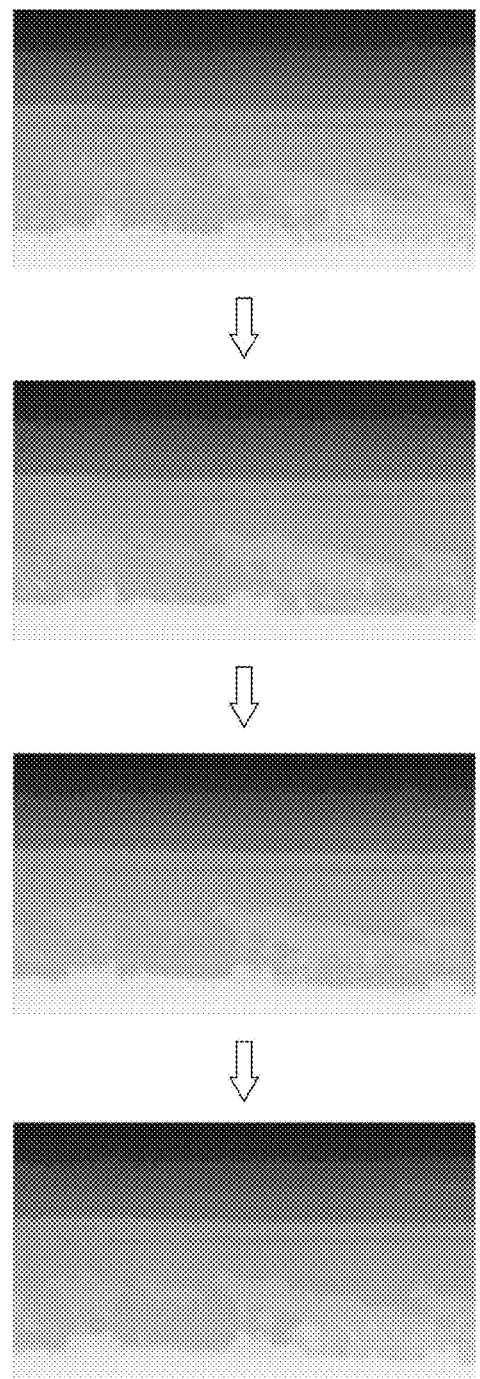

FIGS. 5A and 5B are diagrams comparatively illustrating depth map image two generated by applying a three-dimensional converting method in the related art and a three-dimensional converting method according to the present disclosure to consecutive identical frames, respectively.

As shown in FIG. 5A, it can be identified that a depth map image generated by a method in the related art is changed without continuity between frames even though the frames are consecutive frames. This is a fatal error causing a flickering phenomenon. In contrast, as shown in FIG. 5B, it can be identified that a depth map image generated according to the present disclosure is smoothly changed with continuity between frames.

Since the present disclosure performs an operation processing again only for an area in which a motion is detected through the difference image, instead of the entire frame, in a processing procedure for generating the division image and the depth map image, it is possible to obtain effects of reducing complexity of the operation and significantly improving a processing rate.

Figure 6:
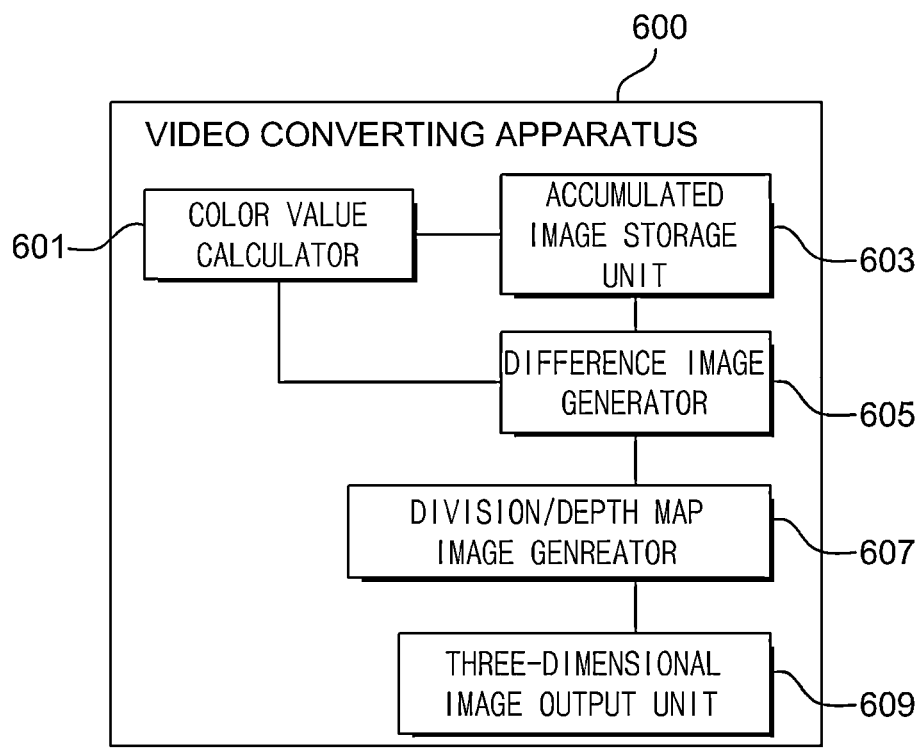
FIG. 6 is a configuration diagram of an apparatus for converting a two-dimensional video to a three-dimensional video according to an exemplary embodiment of the present disclosure.

FIG. 6 is a configuration diagram of an apparatus for converting a two-dimensional video to a three-dimensional video according to an exemplary embodiment of the present disclosure.

Referring to FIG. 6, a video converting apparatus 600 according to an exemplary embodiment of the present disclosure includes a color value calculator 601 configured to compare an image of an $n^{th}$ frame and an accumulated image of an $n-1^{th}$ frame among a plurality of frames included in the two-dimensional video to calculate a difference in a color value for each pixel, a difference image generator 605 configured to generate a difference image including information on a change in the color value for each pixel of the $n^{th}$ frame by using the calculated difference in the color value, an accumulated image storage unit 603 configured to store the accumulated image generated by accumulating the information on the change in the color value for each pixel until the $n^{th}$ frame, a division/depth map image generator 607 configured to generate a division image and a depth map image of the $n^{th}$ frame by newly performing an operation only for a pixel in which a change in a color value is equal to or larger than a predetermined level in the $n^{th}$ frame by using the generated difference image and a three-dimensional image output unit 609 configured to convert the image of the $n^{th}$ frame to a three-dimensional image by using the generated depth map image and output the converted three-dimensional image.

The difference image generator 605 can generate the difference image of the $n^{th}$ frame by dividing a pixel in which a difference in a color value for each pixel between an image of the $n^{th}$ frame and an accumulated image of the $n-1^{th}$ frame is equal to or larger than a predetermined value and a pixel in which a difference in a color value is smaller than the predetermined value into a first area and a second area.

The accumulated image storage unit 603 can allocate the color value of the image of the $n^{th}$ frame to a pixel included in the first area of the difference image in the $n^{th}$ frame and allocates the color value of the accumulated image until the $n-1^{th}$ frame to a pixel included in the second area, and thus store an accumulated image until the $n^{th}$ frame.

The division/depth map image generator 607 divides the image of the $n^{th}$ frame into two or more division areas according to a color value of each pixel, and can generate the division image of the $n^{th}$ frame by newly determining a division area only for a pixel included in the first area of the difference image and equally applying a division area of the $n-1^{th}$ frame for a pixel included in the second area. The division/depth map image generator 607 may generate the depth map image of the $n^{th}$ frame by backwardly allocating a depth value in a unit of division areas from a bottom side to a top side of the division image of the $n^{th}$ frame according to a predetermined depth value assignment rule.

The three-dimensional image output unit 609 shifts the image of the $n^{th}$ frame according to the depth value of the generated depth map image to horizontally generate left and right parallax, thereby implementing a three-dimensional image.

A detailed image converting method and its effect by respective components of the video converting apparatus 600 are the same as those described through the exemplary embodiments with respect to the method.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of converting a two-dimensional video to a three-dimensional video, the method comprising:

comparing an image of an $n^{th}$ frame with an accumulated image until an $n-1^{th}$ frame in the two-dimensional video to calculate a difference in a color value for each pixel;

generating a difference image including information on a change in a color value for each pixel of the $n^{th}$ frame by using the difference in the color value;

storing an accumulated image until the $n^{th}$ frame by accumulating the information on the change in the color value for each pixel until the $n^{th}$ frame;

performing an operation only for a pixel in which a change in a color value is equal to or larger than a predetermined level in the $n^{th}$ frame by using the difference image to generate a division image and a depth map image of the $n^{th}$ frame; and converting the image of the $n^{th}$ frame to a three-dimensional image by using the depth map image.

2. The method of claim 1, wherein the generating of the difference image comprises generating an image by classifying a pixel in which the difference in the color value between the image of the $n^{th}$ frame and the accumulated image until the $n-1^{th}$ frame is equal to or larger than a predetermined value into a first area and a pixel in which the difference in the color value is smaller than the predetermined value into a second area, respectively.

3. The method of claim 2, wherein the storing of the accumulated image comprises allocating a color value of the image of the $n^{th}$ frame to a pixel included in the first area of the difference image in the $n^{th}$ frame and allocating a color value of the accumulated image until the $n-1^{th}$ frame to a pixel included in the second area.

4. The method of claim 2, wherein the generating of the division image comprises dividing the image of the $n^{th}$ frame into two or more division areas according to a color value for each pixel, wherein a division area is newly determined only for a pixel included in the first area of the difference image and a division area of the $n-1^{th}$ frame is equally applied to a pixel included in the second area.

5. The method of claim 4, wherein the generating of the depth map image comprises backwardly allocating a depth value in a unit of division areas from a bottom side to a top side of the division image of the $n^{th}$ frame according to a predetermined depth value assignment rule.

6. The method of claim 5, wherein the converting to the three-dimensional image comprises shifting the image of the $n^{th}$ frame according to the depth value of the depth map image to horizontally generate left and right parallax.

* * * * *